US010233063B2

(12) United States Patent
Gathman

(10) Patent No.: US 10,233,063 B2
(45) Date of Patent: Mar. 19, 2019

(54) FILTER TUBE INSTALLATION APPARATUS

(71) Applicant: TCT Innovations LLC, Walnut Grove, MO (US)

(72) Inventor: Travis Gathman, Walnut Grove, MO (US)

(73) Assignee: TCT Innovations LLC, Walnut Grove, MO (US)

( * ) Notice: Subject to any disclaimer, the term of this patent is extended or adjusted under 35 U.S.C. 154(b) by 238 days.

(21) Appl. No.: 15/075,020

(22) Filed: Mar. 18, 2016

(65) Prior Publication Data

US 2016/0273678 A1 Sep. 22, 2016

Related U.S. Application Data

(60) Provisional application No. 62/136,025, filed on Mar. 20, 2015.

(51) Int. Cl.
*B66F 9/18* (2006.01)
*F16L 3/01* (2006.01)
*B65H 49/06* (2006.01)
*B65H 57/06* (2006.01)
*B65H 57/18* (2006.01)

(52) U.S. Cl.
CPC ............... *B66F 9/18* (2013.01); *B65H 49/06* (2013.01); *B65H 57/06* (2013.01); *B65H 57/18* (2013.01); *F16L 3/01* (2013.01)

(58) Field of Classification Search
CPC ........ B65H 57/06; B65H 57/18; B65H 49/06; B66F 9/18; F16L 3/01
USPC ............... 242/400, 403, 557, 615.3
See application file for complete search history.

(56) References Cited

U.S. PATENT DOCUMENTS 7,566,024 B2 * 7/2009 Krise .................... B60P 1/6463
242/397.1
8,876,032 B1 11/2014 Gibbons et al.
2009/0020369 A1 1/2009 Warachka
2009/0304460 A1 12/2009 O'Dell
(Continued)

FOREIGN PATENT DOCUMENTS

CH 709487 A2 * 10/2015 ............... B66F 9/18
WO 2011001183 A1 1/2011

OTHER PUBLICATIONS

International Search Report and Written Opinion corresponding to International Patent Application No. PCT/US2016/023299, dated Jun. 20, 2016.

*Primary Examiner* — William E Dondero
(74) *Attorney, Agent, or Firm* — Kutak Rock LLP; James H. Jeffries

(57) ABSTRACT

An apparatus for unloading and installing palletized filter tubes which includes a rack having an attachment for a roller cage assembly. The cage includes at least one roller and is positioned horizontally and outward from the rack. The filter tube is positioned through the cage and over at least one roller and fastened at the free end to the ground or other filter tubing. The apparatus is attached to a skid steer, truck bed or other movable machinery and as the machinery moves forward the palletized filter tube is pulled through the cage assembly. Retention bars may be provided to retain the palletized filter tube in place as the vehicle moves. In one iteration, the retention bars are hydraulically operated and can be opened for loading of palletized filter tube.

8 Claims, 9 Drawing Sheets

(56) References Cited

U.S. PATENT DOCUMENTS

2014/0070045 A1\* 3/2014 Robinson ............... B65H 49/32
 242/566
2016/0325945 A1\* 11/2016 Berger ................... B66C 1/422
2018/0118553 A1\* 5/2018 Cohen .................. B67D 3/0029

\* cited by examiner

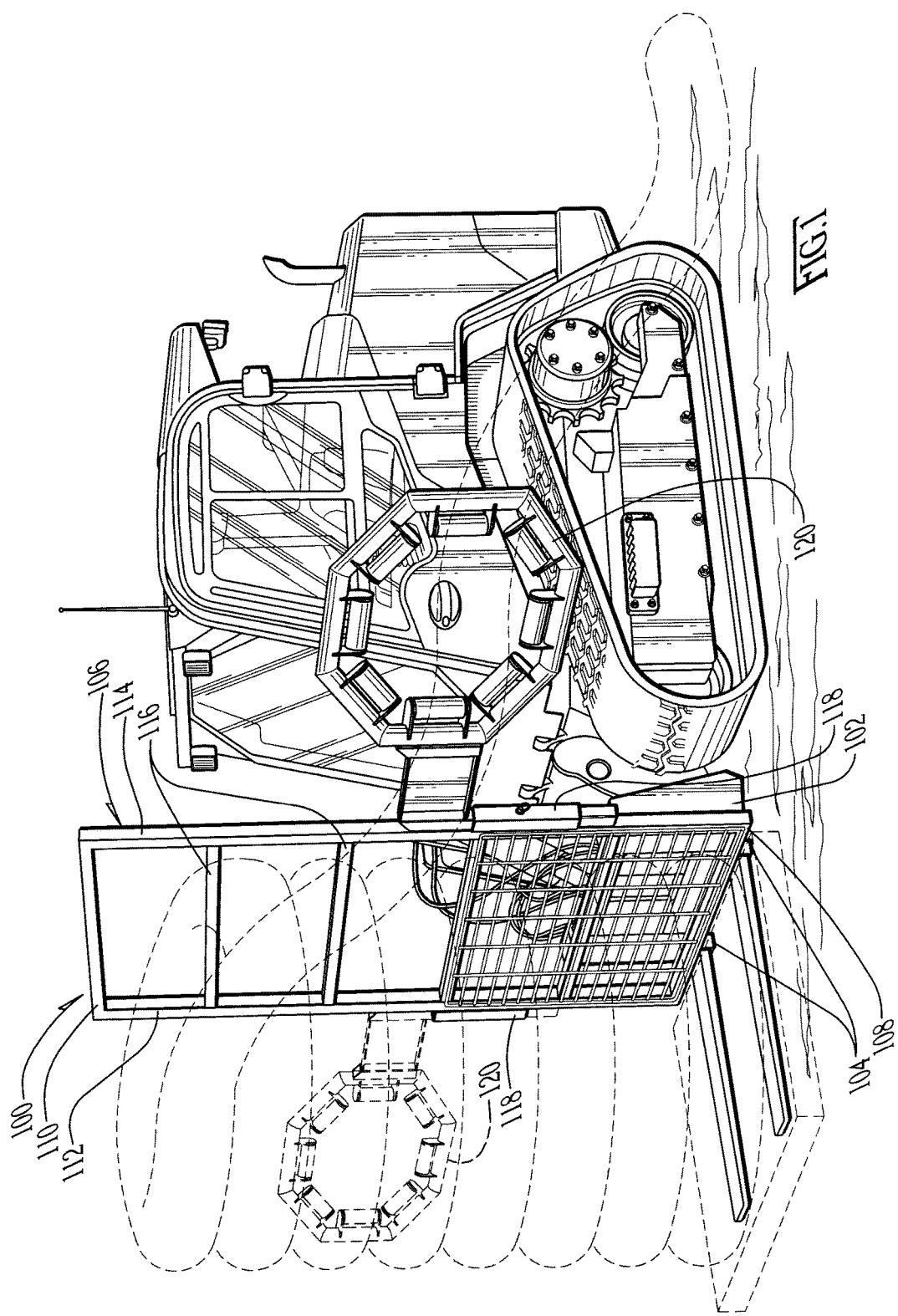

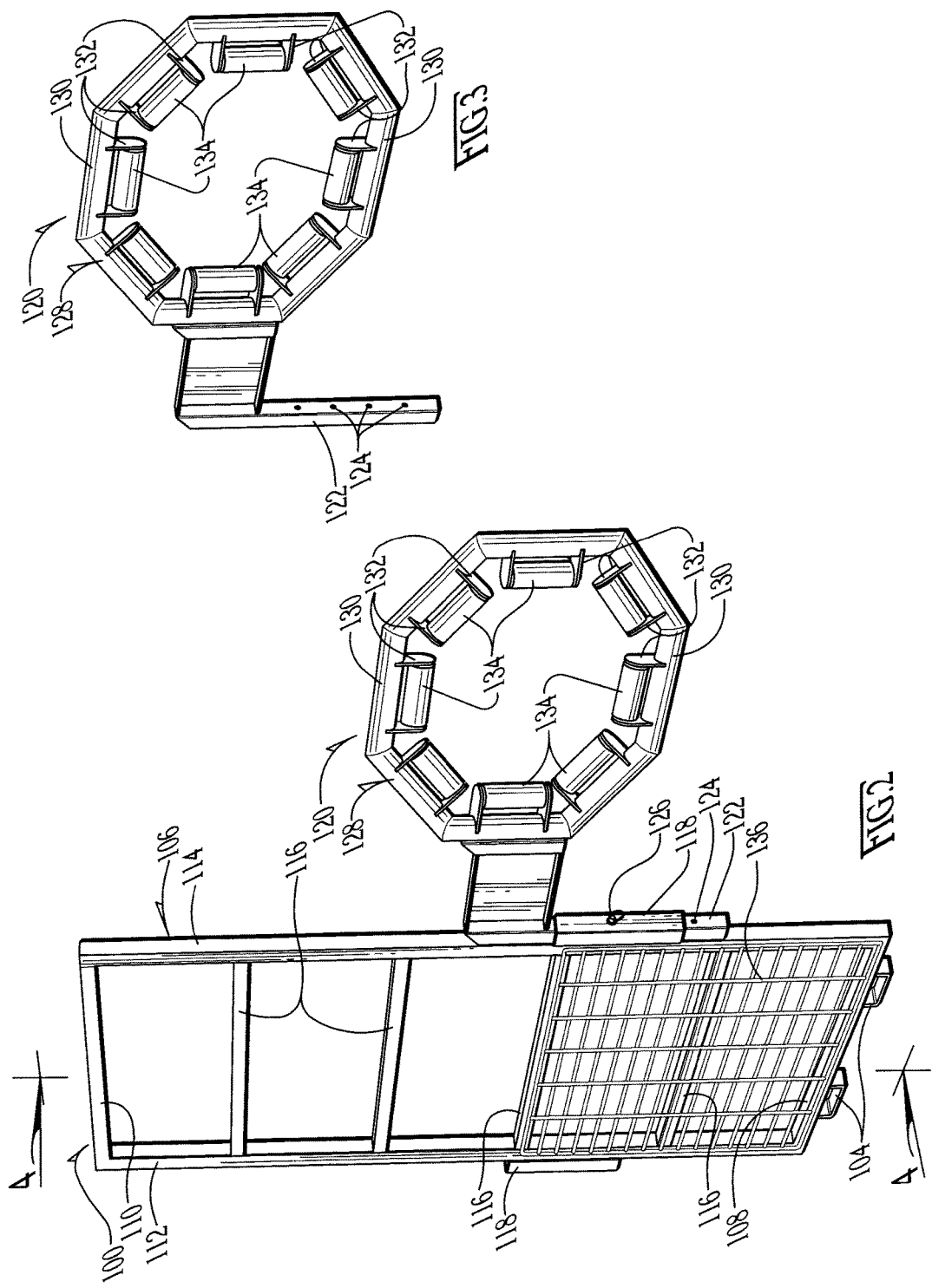

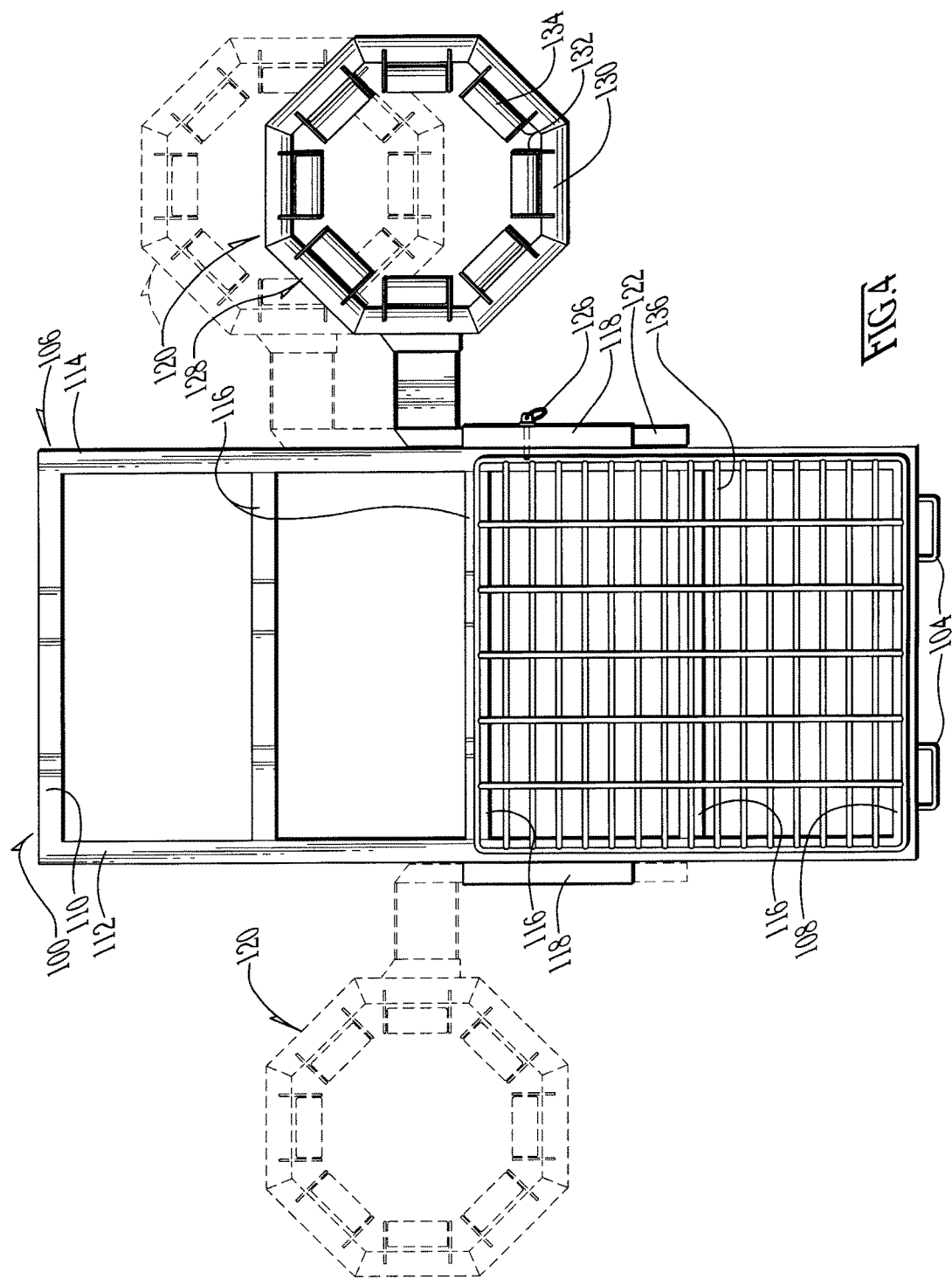

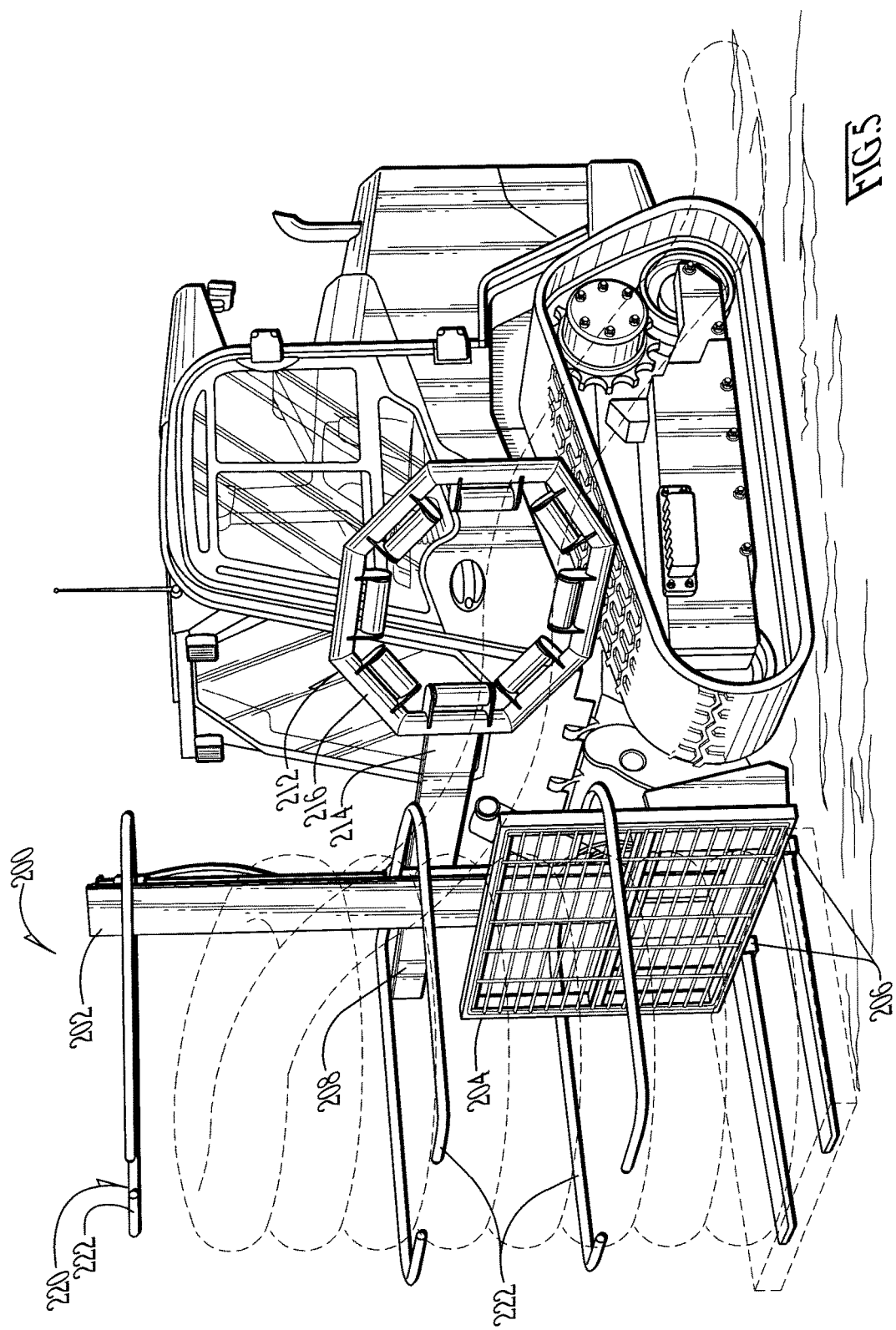

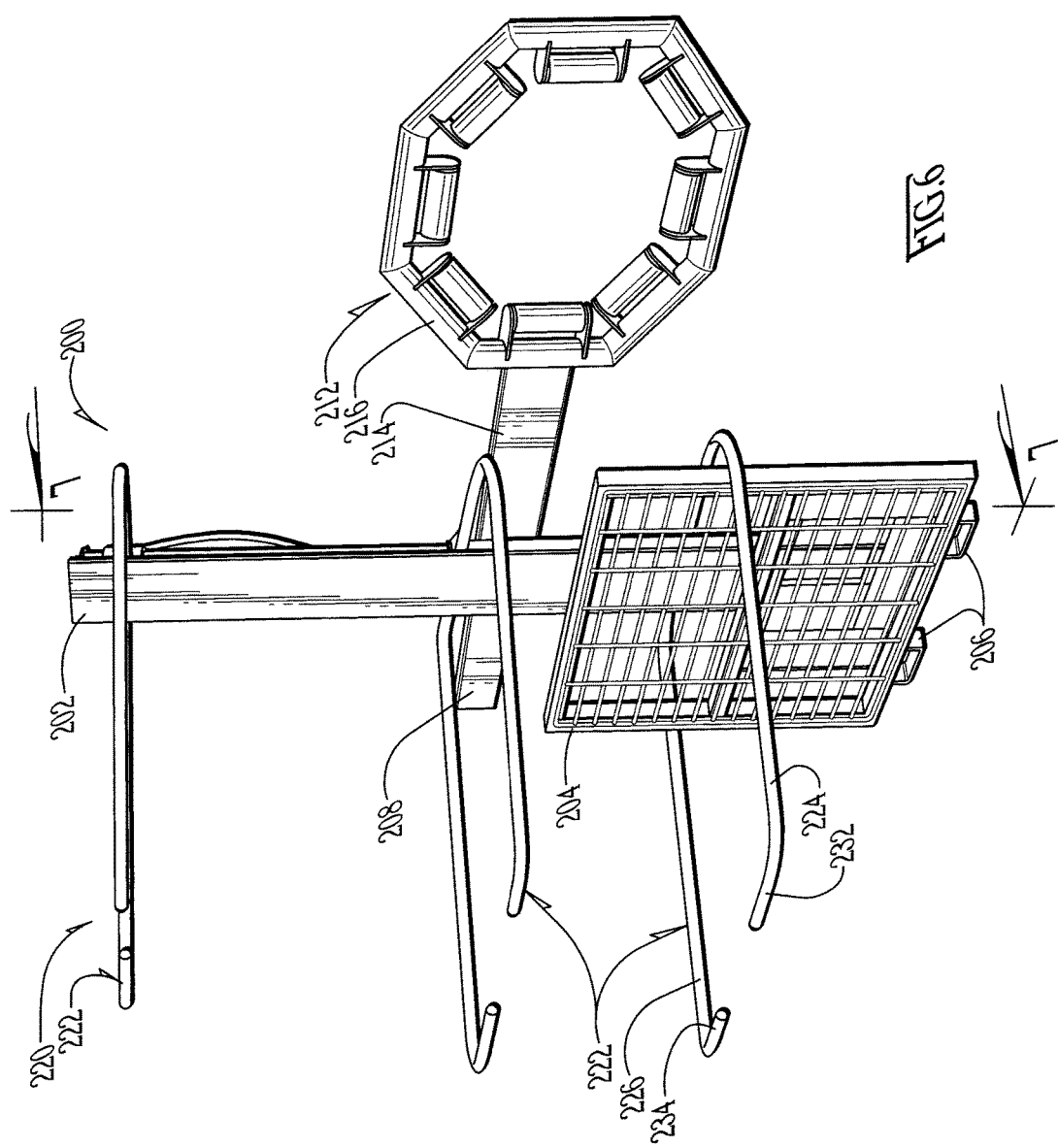

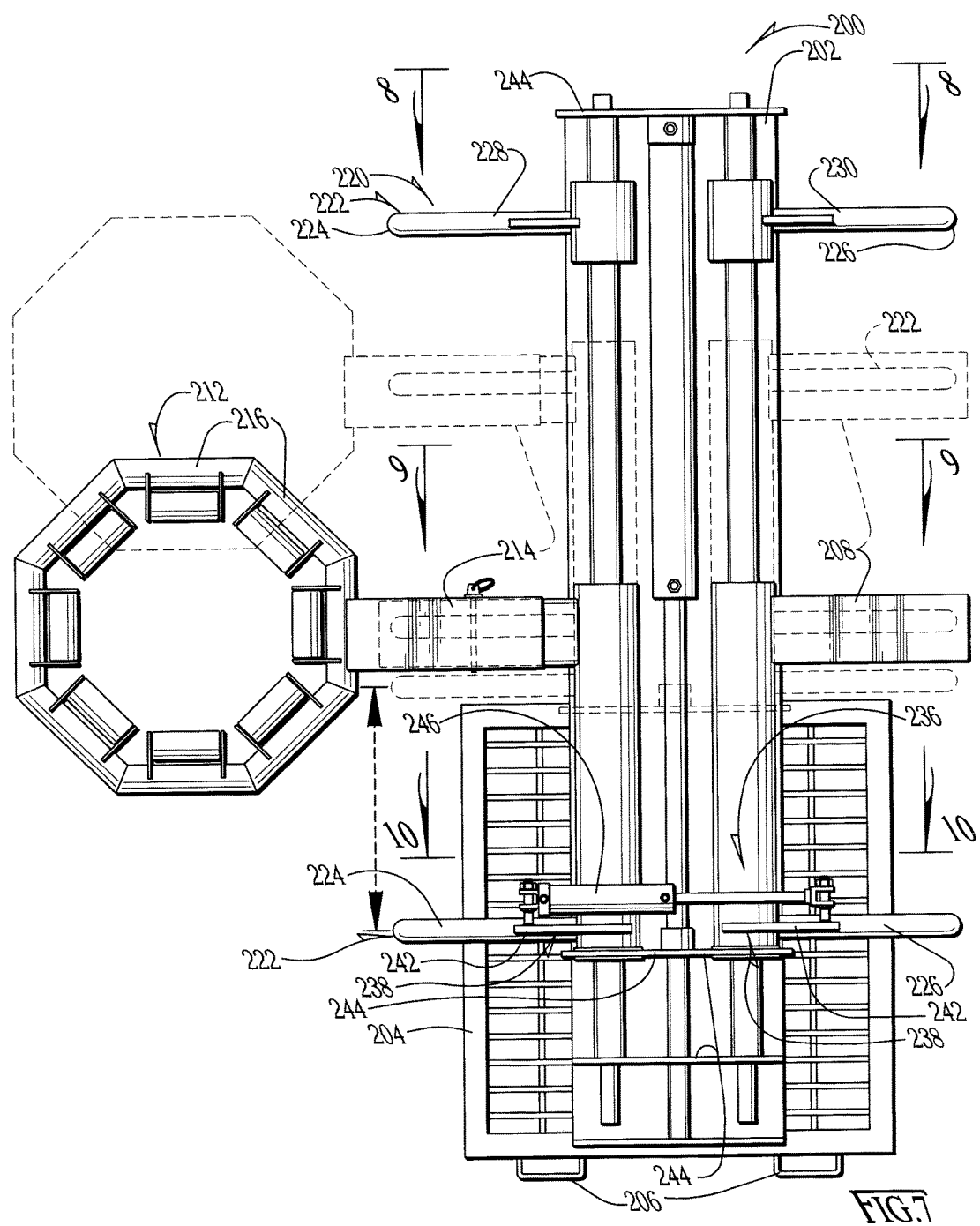

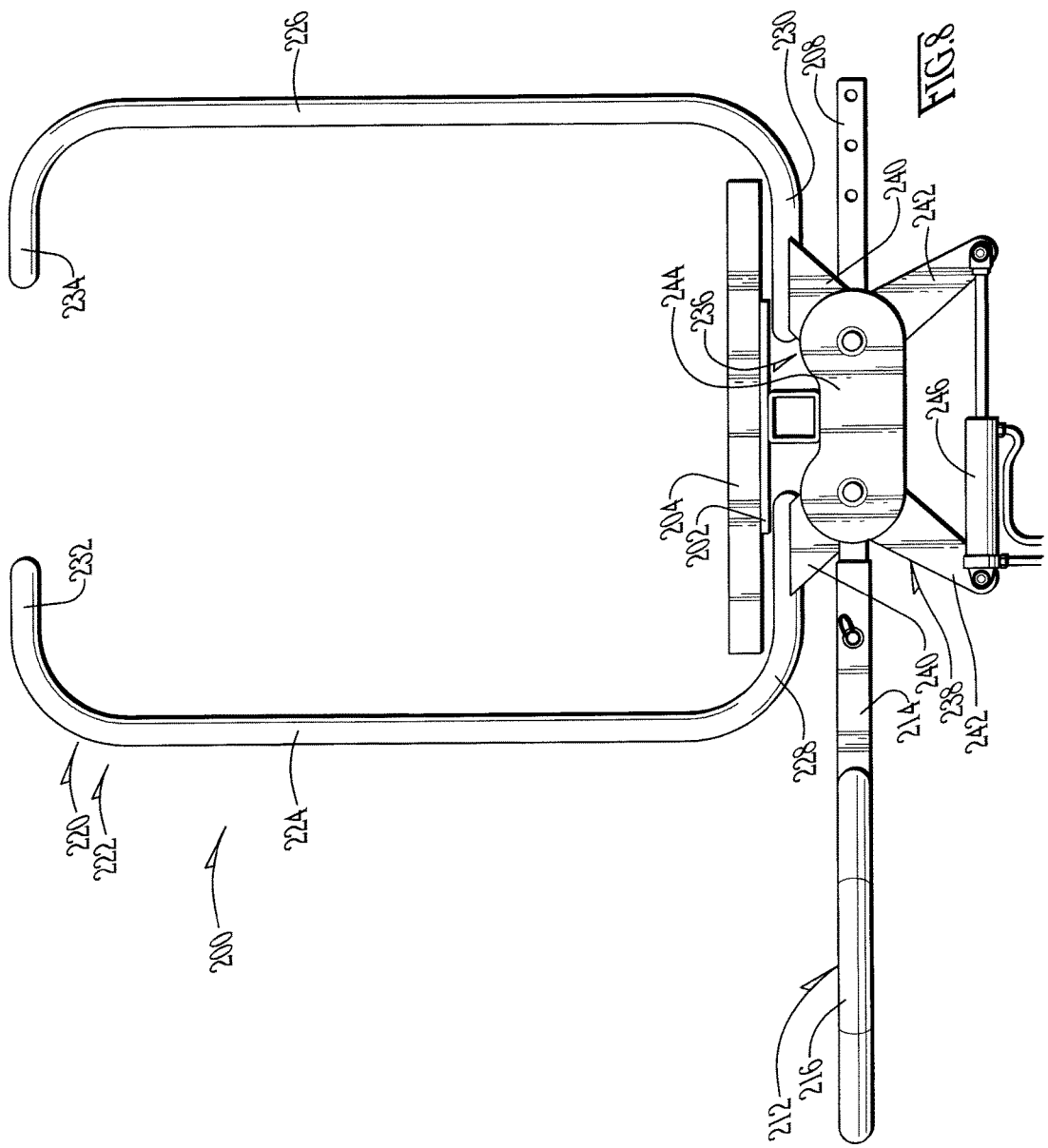

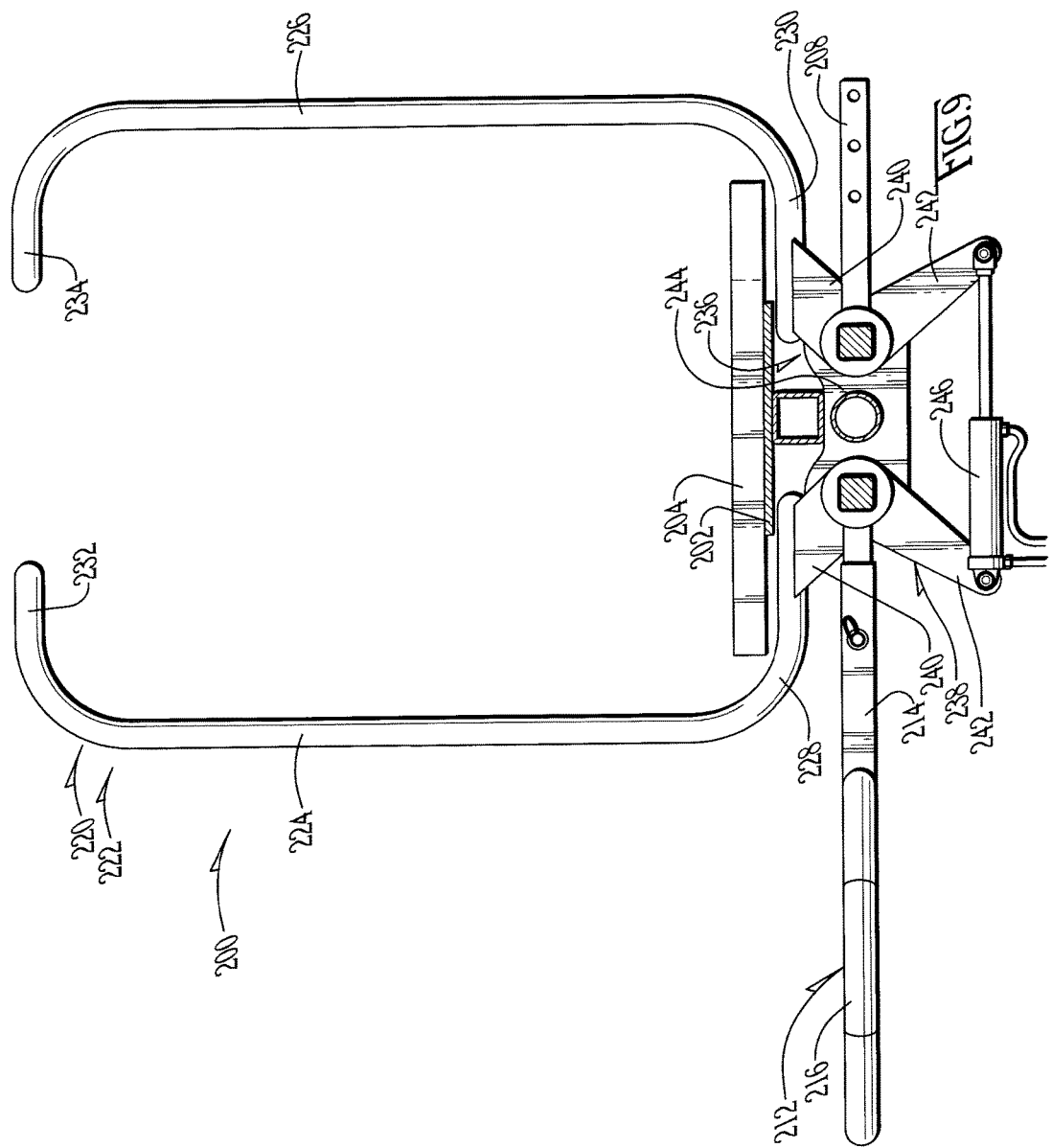

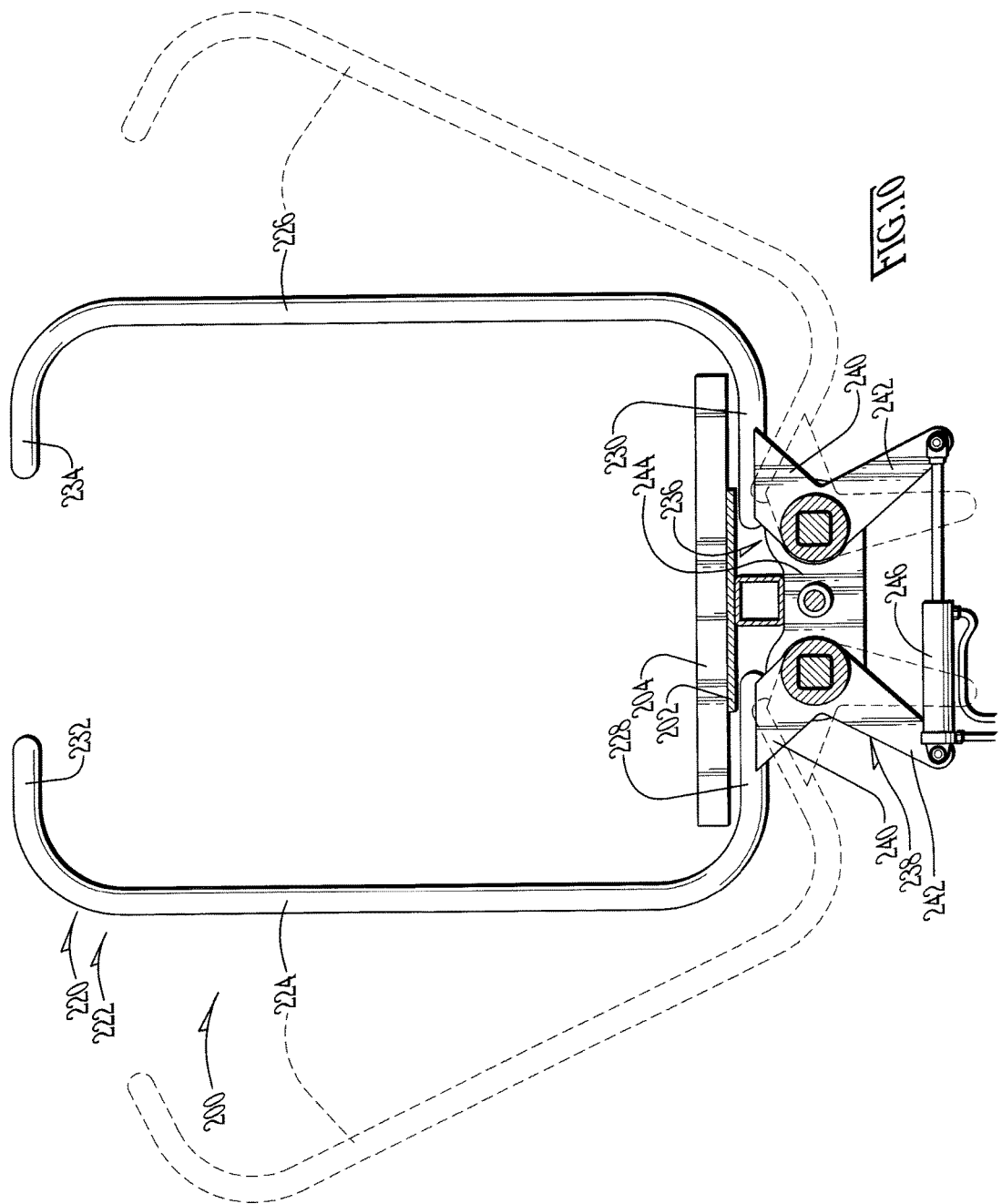

FILTER TUBE INSTALLATION APPARATUS

CROSS-REFERENCE TO RELATED APPLICATIONS

This application claims the benefit of priority to U.S. application Ser. No. 62/136,025 filed Mar. 20, 2015, the entire content of which is hereby incorporated by reference into this application.

BACKGROUND OF THE INVENTION

The instant invention comprises a novel apparatus for unloading and installing palletized filter tubes. Filter tubes are low impact development tools that are typically used during construction projects to facilitate bank stabilization, to limit sediment runoff and to protect inlets to storm water drains. Commonly, filter tubes are used as perimeter controls during construction to stabilize topsoil, mulch or other landscaping materials to prevent those materials from being dislodged and swept away by rainwater or storm water runoff. In many locations, the use of filter tubes to limit soil runoff during construction is required by building code.

These filter tubes are three dimensional tubes used to trap the physical, chemical and biological pollutants in storm water. Moreover, filter tubes can be used to create a temporary ponding area behind the tube to allow suspended solids to settle out of the ponded water. Generally, filter tubes are manufactured by filling a porous fabric tube with a clean filter media. Common materials for the fabric tube include polypropylene and other plastic derivatives. The filter media may include woodchips, fabric, charcoal, absorbent sponge or any number of other materials depending on the intended application.

Generally, filter tubes are provided in lengths of 25 to 200 feet in length. They are often provided by manufacturers on pallets with the pallet then wrapped for shipping. Current installation methods for a filter tube are labor intensive and time consuming. Manual labor is often used to remove the filters tubes from the pallet where it is then unrolled and positioned by workers. The tubes are cumbersome, unwieldy and usually require multiple workers for manual installation. For large construction projects the installation of filter tubes as sediment barriers, storm water ponding areas and the like is very time consuming and labor intensive, often adding thousands of dollars to site preparation and site maintenance cost.

The instant invention is a simple mechanical apparatus that is intended to decrease manual labor and substantially speed up installation time for tube filters at construction sites. At the time of filing this application there are no known mechanical devices in use or available on the market which can be used to assist in performing the task of unloading and installing palletized filter tubes.

GENERAL DESCRIPTION OF THE INVENTION

The invention is a filter tube installation apparatus which is used to unload palletized filter tube while simultaneously placing it for installation or temporary fastening. Filter tubes, marketed under a variety of names including the well-known Soxx™ brand which is marketed by Filtrexx® and others are used to control topsoil, sediment, mulches and landscaping materials at construction sites. Filter tubes or Filter Soxx™ are used for a variety of other applications on construction sites. Most commonly, the filter tubes are delivered to a worksite on wooden pallets that holds between 25 and 200 feet of filter tube provided in stacked coils.

The present invention is preferably provided as a standard universal skid steer attachment which holds and secures a pallet loaded with a coiled filter tube and which facilitates unloading and installation of the filter tube directly from the pallet as the skid steer is operated. More particularly, the inventive apparatus includes a base which is mountable to a skid steer. There are several different types of skid steer mounts and the base can be configured to accommodate each such mount. Commonly, skid steers can be provided with forklift tongs and in it preferred configuration, the base is fitted with simple slide tubes configured to receive and retain the device onto the tongs of the skid steer mounted forklift apparatus. The base can also be configured for attachment to other vehicles or directly to a truck bed.

The base of the apparatus is large enough to accommodate a standard wooden pallet but can be modified in size to accommodate virtually any dimension. The base is generally rectangular and presented with a back, a front and two parallel sides separating the front and back portions. It is to be understood that the base is oriented such that the back portion is closest to the skid steer when mounted. It is preferred that the base be manufactured from metal tubing. Slide tubes may be mounted on the base to receive forklift forks. At the back of the base and generally perpendicular thereto, an upright metal frame or rack is provided which creates a barrier between the palletized material and the skid steer and helps stabilize the palletized tube filter during transportation and deployment. This upright rack or is also comprised of tubular steel and is generally rectangular in configuration. The upright rack has a bottom rail, a top rail and two spaced apart side rails situated therebetween to form a generally rectangular platform. The upright rack is oriented perpendicular to the base by connecting the bottom rail of the rack near the back of the base.

In one embodiment, at the top of the vertical rack is a top rail which is a hollow metal tube. A roller support beam is slidably positioned within the top rail. The roller support beam is connected to a roller cage. The roller cage is positioned generally laterally to the side of one of the side rails of the upright rack and can be selectively positioned at either side of the rack. The cage is manufactured from a plurality of cage side beams. Preferably, there are eight cage side beams fastened together to form an octagon. It is to be understood that other shapes can be made using different numbers and configurations of cage side beams. A plurality of rollers are provided in the cage. In the preferred configuration, one roller is provided on each of the plurality of cage side beams and oriented generally inward respective to one another such that the plurality of rollers are concentrically oriented about the inner periphery of the cage. Each roller is mounted to the respective cage side beam by mechanically fastening the roller components to a roller bracket such that the roller freely spins within the roller bracket. It is to be understood that the cage can be moved to either side by simply removing the roller support beam from the top rail and repositioning it to the opposite side of the apparatus.

In a second embodiment, the roller support beam includes a clamping bracket opposite the roller cage. The clamping bracket is moveably securable to one of the side rails of the upright rack. Because the clamping bracket is moveable, it allows the associated cage to be moved vertically up and down the side rail to a preferred position by the user. Additionally, the roller support beam can be manufactured with a tube in a tube configuration so that the roller support beam can be extended and retracted with respect to the side beam of the upright rack.

To install the filter tube from the apparatus, a pallet of filter tube is loaded onto the base. The uppermost end of the filter tube presented in the coil of filter tubing is routed through the plurality of rollers of the roller cage and fastened into place on the ground where desired. As the skid steer moves forward the filter tube is forcibly unwound from the provided coil as it is pulled through the cage mechanism. The apparatus is preferably utilized on a skid steer having hydraulic controls which allow both vertical and horizontal movement of the base respective the skid steer.

It is preferred that the apparatus be manufactured from tube steel or a rounded square tube and is provided with no sharp corners, edges or points that could damage the filter tube. The roller cage itself is adjustable and can be moved inward and outward with respect to the upright platform. Moreover, the roller cage can be presented with a top portion and bottom portion that are releasably connected. This allows the upper portion to be moved upward respective from the bottom portion for installation of the filter tube through the roller cage.

It should be understood that this device can be adapted to mount on a truck for unloading multiple pallets of filter tube presented on the truck bed.

In another configuration, a plurality of support tubes are provided on the upright platform above and generally parallel the base. The support rails can be presented in any number and configuration that are used to retain the palletized filter tube on the device during transit. In the preferred configuration, the support rails are hinged and can be opened via hydraulic rams to facilitate loading of palletized filter tube.

It should also be understood that while at least one roller in the roller cage is beneficial to the unloading and installation of the filter tube from the pallet, any number of rollers may be positioned within the cage depending on the application and intended use.

GENERAL DESCRIPTION OF THE DRAWINGS

FIG. 1 is a perspective view of the filter tuber installation apparatus mounted on a skid steer.

FIG. 2 is another perspective view of the filter tube installation apparatus.

FIG. 3 is a partial perspective view showing the roller cage and mounting arm of the filter tube installation apparatus for installation.

FIG. 4 is a front planar view of the roller cage assembly and that it is moveable from side to side of the back and is slidable upward and downward.

FIG. 5 is a perspective view of the inventive device in an operational position for deployment of filter tube from a palletized coil of filter tube and showing the filter tube retention bars.

FIG. 6 is a partial perspective view of the device with filter tube retention bars.

FIG. 7 is a back plan view of the device taken along line 7-7 of FIG. 6, showing hydraulically operated filter tube retention bars and a preferred configuration of the roller cage assembly.

FIG. 8 is a top plan view taken along line 8-8 of FIG. 7.

FIG. 9 is a sectional view taken along line 9-9 of FIG. 7.
FIG. 10 is a sectional view taken along line 10-10 of FIG. 7.

DETAILED DESCRIPTION OF THE INVENTION

The invention is a filter tube installation apparatus which is used to unload and install palletized filter tubes used in the construction industry. Referring generally to the drawings, the preferred embodiment of the present invention is a standard universal skid steer attachment which holds and secures a pallet loaded with a coiled filter tube and which facilitates unloading and installation of the filter tube directly from the pallet as the skid steer is operated. More particularly, and as shown in FIG. 1, the inventive apparatus 100 includes a base 102 which is mountable to a skid steer. There are several different types of skid steer mounts and the base can be configured to accommodate each such mount. Commonly, skid steers can be provided with forklift tongs and in it preferred configuration, the base is fitted with a pair of simple slide tubes 108 configured to receive and retain the device onto the tongs of the skid steer mounted forklift apparatus. The base can also be configured for attachment to other vehicles or directly to a truck bed.

As shown in FIGS. 1 and 2, the base 102 adjacent the base 102 and generally oriented upward therefrom is an upright metal frame or rack 106 is provided which creates a barrier between the palletized material and the skid steer, and helps stabilize the palletized tube filter during transportation and deployment. This upright rack 106 is also comprised of tubular steel and is generally rectangular in configuration. The upright rack has a bottom rail 108, a top rail 110, and two spaced apart side rails 112, 114 situated therebetween to form a generally rectangular rack. Additional horizontal stabilizer bars 116 may be added for rigidity and strength.

A mounting bracket 118 for removably attaching a roller cage assembly 120 to a side rail 112, 114 of the rack 106 is best shown in FIGS. 2 and 4. The mounting bracket 118 is a hollow tube fastened in an up/down orientation and in alignment with either, or preferably both side rails 112, 114 of the rack 106 as shown. The roller cage assembly 120 includes a mounting bar 122 which is sized to be received into the mounting bracket 118. The mounting bar 122 is preferably angled at a first end 123. The preferred angle is approximately 90 degrees.

Any variety of adjustment means may be provided to facilitate vertical adjustment of the mounting bar 122 within the mounting bracket 118. The adjustment means shown in FIGS. 2 and 3 is a plurality of adjustment holes 124 provided in the mounting bar 122 which are aligned with a mounting hole (not shown) through the mounting bracket 118 and securable at a preferred position with a pin 126, or similar fastener. The vertical adjustment of the mounting bar 122 within the mounting bracket 118 is best shown in FIG. 4. It is to be understood that the cage 128 can be moved to either side of the upright rack 106 by removing the cage mounting bar 122 from a mounting bracket 118 and repositioning it to the opposite side of the apparatus.

A roller cage 128 is manufactured from a plurality of cage side beams 130 and is fastened to, or formed integrally with, the first end 123 of mounting bar 122. Preferably, there are eight cage side beams 130 fastened together to form an octagon. It is to be understood that other shapes can be made using different numbers and configurations of cage side beams although it has been determined through product evaluation that an eight sided roller cage is superior to other configurations A plurality of roller mounting brackets 132 are mounted within the cage 128 with one roller mounting bracket 132 in linear alignment with and fastened to a cage side beam 130. A plurality of rollers 134 is provided and one roller 134 is mounted to each roller mounting bracket 132 and oriented generally inward respective to one another such that the plurality of rollers 134 are concentrically oriented about the inner periphery of the cage 128. Each roller 134 is mounted to the respective cage side beam 130 by mechanically fastening the roller to a roller mounting bracket 132 so that it freely spins. The orientation, spacing and number of rollers is important because the filter tube deployment is often in rough and hilly terrain so the overall orientation of the skid steer respective the ground may change frequently. During application the skid steer may experience upslope, downslope and side slope. As the terrain changes, the filter tube position within the cage 128 changes so that it engages different rollers. For example, when traversing a downslope, the filter tube will likely engage the uppermost roller(s) and while traversing a side slope, the filter tube will likely engage one or more of the rollers on the sides of the cage. There are numerous rollers available that will be suitable for this application. A guard 136 may be provided above the base 102 of the rack to secure a pallet of filter tube.

In a second embodiment of the device 200, the rack 106 is replaced by at least one upright beam 202 as shown in FIGS. 5 and 6. The device includes a base 204 with slide tubes 206 for forklift tongs. A mounting bracket 208, best shown in FIG. 7, is mounted to either side of the upright beam 202. The mounting bracket 208 is substantially perpendicular the upright beam 202, but can be angled or offset depending on the specific application. A roller cage assembly 212 includes a mounting bar 214 which is sized to be received into the mounting bracket, or as shown, may be a hollow tube large enough to slide over the mounting bracket 208. Any variety of adjustment means may be provided to facilitate horizontal adjustment of the mounting bar 214 within, or over, the mounting bracket 208. It is to be understood that the cage 212 can be moved to either side of the upright beam 202 by removing the cage mounting bar 214 from a mounting bracket 208 and repositioning it to the opposite side of the apparatus.

A roller cage 214 is manufactured from a plurality of cage side beams 216 and is fastened to, or formed integrally with the mounting bar 214. The configuration of the roller cage in this embodiment is the same as the first embodiment described herein.

Because palletized tube filter can become dislodged or unwind during the installation process, it is preferred to provide means to retain the filter tube in place. Referring generally to FIGS. 7-10, a filter tube retention assembly 220 is mounted to the device 200 for that purpose. The filter tube retention assembly 220 includes at least one set of hinged retention bars 222 that can be opened and closed in a clamshell fashion. The hinged retention bars include a first U-shaped bar 224 and a second U-shaped retention bar 226, each having a fastening end 228, 230 respectively, and an open end 232, 234 respectively. Each U-shaped retention bar 224, 226 is pivotally fastened at the fastening ends 228, 230 to a hinging mechanism 228 near the upright beam 202 as best shown in FIG. 8. The open ends 232, 234 are spaced apart and, when the U-shaped retention bars are actuated, as described herein, they move apart enough to position a pallet loaded with filter tube between the open ends 232, 234. When in the closed position, as shown in FIG. 8, palletized filter tube is held in place.

The hinging mechanism 236 can be of any mechanical variety that allows the U-Shaped retention bar 224, 226 to open and close. As shown in the figures, one such mechanism is a "scissor" hinge which includes a pair of pivoting flanges 238, each having a first flange 240 connected to a closed end of a U-shaped retention bar 228, 230 and a second flange 242 connected to a hydraulic ram 246. A pivot plate 244 between the first flanges 240 and second flanges 242 facilitate rotation of the pair of pivoting flanges 238 around an axis. As the hydraulic ram 246 actuates, the U-shaped retention bars 224, 226 are moved from a "closed" position to an "open" position best shown in FIG. 10. In the one embodiment, the mounting brackets 208 are fastened directly to the pivot plate 244 rather than the beam 202, as best shown in FIG. 9.

It is to be understood that more than one set of U-shaped bars can be provided which are hinged and hydraulically operated to accommodate loading and unloading of palletized filter tube. Or additional static retention bars may be provided in addition to a single hinged and hydraulically operated set of U-shaped bars. As shown in FIG. 7, the vertical operation of the forklift moves the roller cage assembly 128 up and down as well. The additional sets of U-shaped bars help retain the filter tube in place as the pallet is raised or lowered during installation. In one configuration, each set of U-shaped bars is hydraulically actuated. In another configuration, the U-shaped bars are interconnected such that a single hydraulic ram opens and closes the bars simultaneously. While hydraulically actuated bars are preferred, it is understood that the U-shaped bars can be manufactured so that a user manually opens and closes the bars for loading and unloading of palletized filter tube.

To install the filter tube from the device, a pallet of filter tube is loaded onto the forklift as shown in FIG. 1. The uppermost end of the filter tube presented in the coil of filter tubing is routed between the rollers 134 of the roller cage 128 and fastened into place on the ground where desired. As the skid steer moves forward the filter tube is forcibly unwound from the provided coil as it is pulled across the rollers 134 of the cage 128 The orientation of rollers around the inner periphery of the cage allows the filter tube to be in contact with at least one roller at all times which facilitates unloading the tube without snags, tears or kinks. The apparatus is preferably utilized on a skid steer having hydraulic controls which allow both vertical and horizontal movement of the base respective the skid steer.

It is preferred that the apparatus be manufactured from tube steel or a rounded square tube and is provided with no sharp corners, edges or points that could damage the filter tube. The roller cage 128 itself is adjustable and can be moved inward and outward respective the skid steer. Moreover, the roller cage 128 can be presented with a top portion and bottom portion that are releasably connected. This allows the upper portion to be moved upward respective from the bottom portion for installation of the filter tube through the roller cage.

It should be understood that the roller cage assembly of the device can be adapted to mount on a truck for unloading multiple pallets of filter tube presented on the truck bed.

It should also be understood that while at least one roller in the roller cage is beneficial to the unloading and installation of the filter tube from the pallet, any number of rollers may be positioned within the cage depending on the application and intended use.

What is claimed is:
1. A filter tube installation apparatus for use with a vehicle to install a palletized filter tube, the apparatus comprising:

at least one vertical beam attachable to the vehicle; and a roller cage assembly attached to one of the at least one vertical beam;

the roller cage assembly comprising a cage with an inner periphery and an outer periphery and at least one roller mounted to the inner periphery;

a filter tube retention assembly comprising a first hinged retention bar and a second hinged retention bar each fastened at a fastening end to a hinging mechanism mounted to one of the at least one vertical beam; wherein the hinging mechanism permits the first and second hinged retention bars to pivot from an open position to a closed position.

2. The filter tube installation apparatus of claim 1 further comprising at least one hydraulic ram connected to the first and second hinged retention bars to actuate the first and second hinged retention bars between the open and closed positions.

3. The filter tube installation apparatus of claim 1, wherein the roller cage further comprises at least one hinge and at least one fastener so that the roller cage can be opened for placement of the filter tube inside the inner periphery of the cage.

4. The filter tube installation apparatus of claim 1, wherein the cage has eight sides, is substantially octagon shaped and has eight rollers, with one roller mounted to the inner periphery of each of the eight sides.

5. The filter tube installation apparatus of claim 1, wherein the cage assembly further comprises a mounting bar for attachment to a mounting bracket on the vertical beam and the mounting bar and mounting bracket are both provided with adjustment mechanisms for vertical adjustment of the cage assembly respective the vertical beam.

6. The filter tube installation apparatus of claim 1, wherein the cage assembly further comprises a mounting bar for attachment to a mounting bracket on the vertical beam and the mounting bar and mounting bracket are both provided with adjustment mechanisms for horizontal adjustment of the cage assembly respective the vertical beam.

7. The filter tube installation apparatus of claim 1, wherein the cage assembly further comprises a mounting bar for attachment to a mounting bracket on the vertical beam and the mounting bar and mounting bracket are both provided with adjustment mechanisms for both vertical and horizontal adjustment of the cage assembly respective the vertical beam.

8. The filter tube installation apparatus of claim 1, wherein the cage assembly further comprises a mounting bar and the vertical beam includes a plurality of mounting brackets for selective placement and connection of the cage assembly mounting bar.

* * * * *